(12) United States Patent
Sugiura et al.

(10) Patent No.: US 11,167,453 B2
(45) Date of Patent: Nov. 9, 2021

(54) SAFETY APPARATUS

(71) Applicant: FANUC CORPORATION, Minamitsuru-gun (JP)

(72) Inventors: Fuyuki Sugiura, Yamanashi-ken (JP); Masatoshi Senga, Yamanashi-ken (JP)

(73) Assignee: FANUC CORPORATION, Minamitsuru-gun (JP)

( * ) Notice: Subject to any disclaimer, the term of this patent is extended or adjusted under 35 U.S.C. 154(b) by 0 days.

(21) Appl. No.: 16/925,283

(22) Filed: Jul. 9, 2020

(65) Prior Publication Data

US 2021/0016469 A1  Jan. 21, 2021

(30) Foreign Application Priority Data

Jul. 17, 2019 (JP) .............................. JP2019-131716

(51) Int. Cl.
| | | |
|---|---|---|
| *B29C 45/84* | (2006.01) | |
| *B29C 33/20* | (2006.01) | |
| *B29C 45/17* | (2006.01) | |
| *B29C 33/22* | (2006.01) | |
| *B29C 45/76* | (2006.01) | |
| *B29C 37/00* | (2006.01) | |

(52) U.S. Cl.
CPC ............ *B29C 33/202* (2013.01); *B29C 33/22* (2013.01); *B29C 45/1761* (2013.01); *B29C 45/7653* (2013.01); *B29C 45/84* (2013.01); *B29C 2037/94* (2013.01)

(58) Field of Classification Search
CPC ....... B29C 45/64; B29C 45/84; B29C 33/202; B29C 33/22; B29C 2037/94; F16P 3/08

USPC .................................................. 425/151, 153
See application file for complete search history.

(56) References Cited

U.S. PATENT DOCUMENTS

| | | | | |
|---|---|---|---|---|
| 3,771,936 A * | 11/1973 | Moslo | ...................... | F16P 3/12 425/153 |
| 4,340,346 A * | 7/1982 | Hehl | ...................... | B29C 45/84 425/152 |
| 5,198,249 A * | 3/1993 | Westerkamp | ........... | B29C 45/84 384/909 |
| 5,277,568 A * | 1/1994 | Hirata | ................. | B29C 45/1761 425/151 |
| 5,834,036 A * | 11/1998 | Ueno | ...................... | B29C 45/84 425/151 |
| 6,164,947 A * | 12/2000 | Miyahara | ................ | B29C 45/84 425/136 |
| 7,001,169 B2 * | 2/2006 | Naderhirn | ............... | B29C 45/84 425/136 |
| 8,192,192 B2 * | 6/2012 | Nishimura | .............. | B29C 45/84 425/151 |

(Continued)

FOREIGN PATENT DOCUMENTS

| | | | |
|---|---|---|---|
| JP | 61-71165 | * | 4/1986 |
| JP | S63-134715 U | | 9/1988 |
| JP | 5-84800 | * | 4/1993 |

*Primary Examiner* — James P Mackey
(74) *Attorney, Agent, or Firm* — McGinn I.P. Law Group, PLLC.

(57) ABSTRACT

A safety apparatus includes a safety bar that is capable of moving in a mold clamping direction and a mold opening direction, in conjunction with a moving platen provided with a movable mold, and a latch that contacts the safety bar when a door, which is provided in a cover of an injection molding device, is open, wherein the latch includes a notch in a surface thereof on the mold-opening-direction side.

18 Claims, 6 Drawing Sheets

(56) References Cited

U.S. PATENT DOCUMENTS 10,654,206 B2 * 5/2020 Senga .................. B29C 45/03

* cited by examiner

SAFETY APPARATUS

CROSS-REFERENCE TO RELATED APPLICATION

This application is based upon and claims the benefit of priority from Japanese Patent Application No. 2019-131716 filed on Jul. 17, 2019, the contents of which are incorporated herein by reference.

BACKGROUND OF THE INVENTION

Field of the Invention

The present invention relates to a safety apparatus of an injection molding device.

Description of the Related Art

An injection molding device is provided with a safety device for preventing hazards caused by mold clamping when a door provided in a cover is open.

A safety apparatus disclosed in Japanese Laid-Open Utility Model Publication No. 63-134715 includes three latches (stopper plates) and a safety bar that is capable of moving in a mold clamping direction and a mold opening direction in conjunction with a moving platen (mold clamp) provided with a movable mold. The safety bar has a plurality of joint portions arranged at intervals along the longitudinal direction thereof, and grooves (stepped portions) are formed between the joint portions.

Each of the three latches is arranged at a prescribed retracted position that is distanced from the safety bar when the door provided in the cover is closed. When the door is opened, each of the three latches contacts the safety bar, and at least one of the three latches enters into at least one of the plurality of grooves.

In a state where at least one of the latches is in any of the plurality of grooves, when the safety bar is moved in the mold clamping direction, the joint portions of the safety bar enter into the groove and become caught.

Therefore, the moving platen becomes unable to move in the mold clamping direction, and as a result, hazards caused by clamping the movable mold onto the fixed mold are prevented.

On the other hand, in a state where at least one of the latches is in any of the plurality of grooves, when the safety bar moves in the mold opening direction, the joint portions of the safety bar do not catch on the latch in this groove. Therefore, the moving platen can move in the mold opening direction, and as a result, opening is performed by moving the movable mold away from the fixed mold.

SUMMARY OF THE INVENTION

However, when a joint portion of the safety bar is caught on a latch in a groove of the safety bar, this latch receives an impact. In order to prevent damage or the like to the latch due to this impact, there is a desire to increase the thickness of the latch (latch thickness) in the mold clamping direction and mold opening direction.

However, when the latch thickness is increased, the timing at which the latch enters into a groove of the safety bar when the safety bar moves in the mold opening direction is delayed. When this timing is delayed, there is a concern that incorrect operation will occur, such as all of the plurality of latches not entering into grooves of the safety bar.

Therefore, it is an object of the present invention to provide a safety apparatus that can reduce the delay of the timing at which latches enter into grooves of a safety bar during the mold opening operation, even when the latch thickness is increased.

The present invention is a safety apparatus including a safety bar that movable in a mold clamping direction and a mold opening direction, in conjunction with a moving platen provided with a movable mold; and a latch configured to contact the safety bar when a door is open, the door provided in a cover of an injection molding device, wherein the safety bar includes a plurality of grooves provided at intervals along a longitudinal direction of the safety bar, and an inclined portion that is provided between the plurality of grooves and has a distance from an axis of the safety bar that becomes greater farther in the mold clamping direction, and the latch includes a notch in a surface thereof on a side in the mold opening direction.

According to the present invention, it is possible to reduce the delay of the timing at which latches enter into grooves of a safety bar during the mold opening operation, even when the latch thickness is increased.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

The following describes in detail preferred embodiments of the present invention, while referencing the accompanying drawings. Directions mentioned in the description below are in accordance with arrows shown in the drawings.

Embodiments

Figure 1:
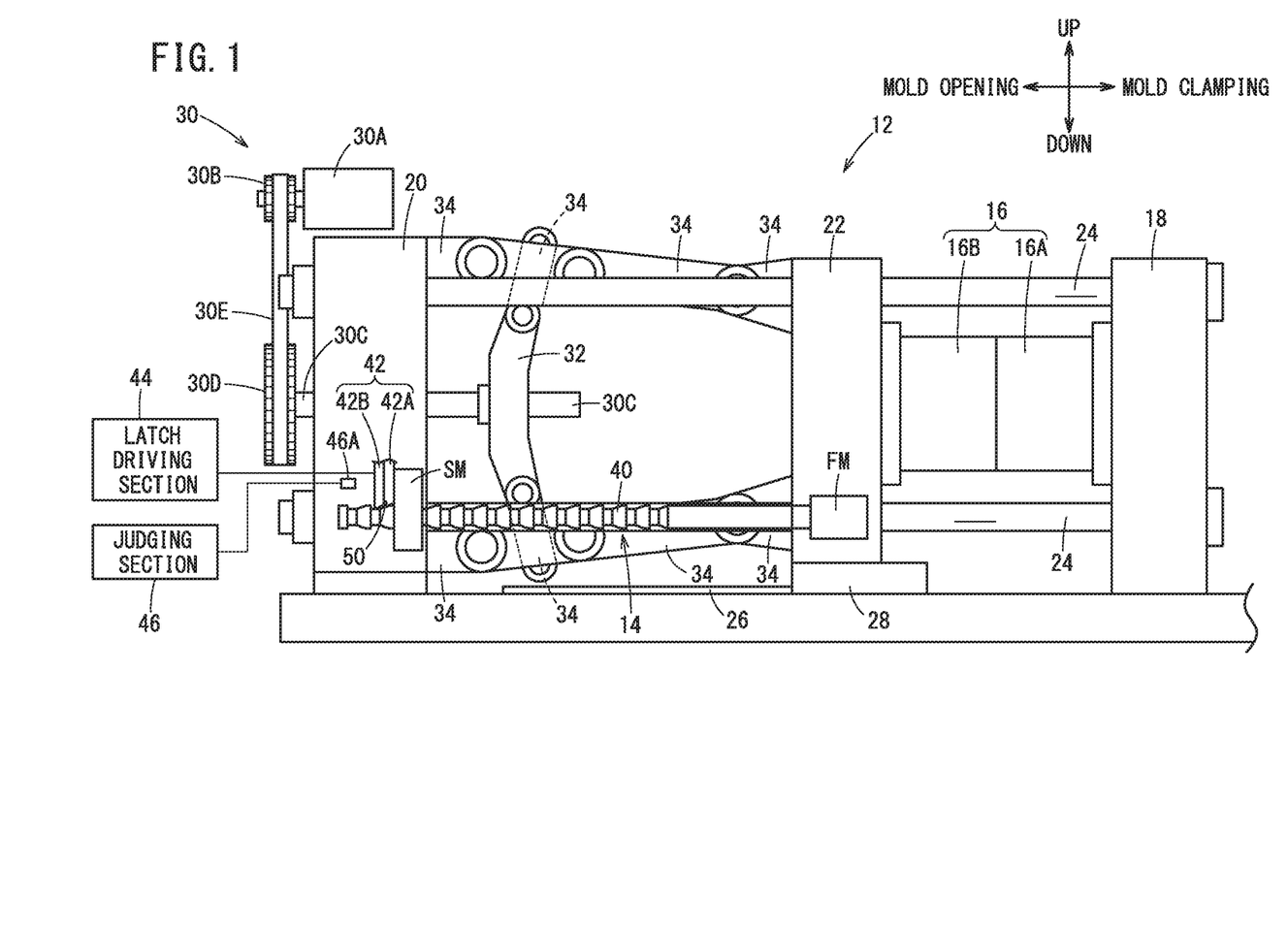
FIG. 1 is a side view of a mold fastening mechanism and a safety apparatus of an embodiment.

The following describes a mold clamping mechanism 12 and a safety apparatus 14 provided to an injection molding device according to the present embodiment, using FIG. 1.

The mold clamping mechanism 12 includes a mold 16, a stationary platen 18, a rear platen 20, and a moving platen 22.

The mold 16 includes a fixed mold 16A and a movable mold 16B that is capable of moving in a mold clamping direction and a mold opening direction relative to the fixed mold 16A. The fixed mold 16A is attached to the stationary platen 18, and the movable mold 16B is attached to the moving platen 22.

The stationary platen 18 and the rear platen 20 are fixed to a machine base of the injection molding device with a space between these platens, and are connected by a plurality of tie bars 24 that extend in the mold clamping direction and the mold opening direction.

The moving platen 22 is arranged between the stationary platen 18 and the rear platen 20. The plurality of tie bars 24 each penetrate through the moving platen 22.

Furthermore, the moving platen 22 is provided with a slide portion 28 that fits into a guide rail 26. The guide rail 26 extends in the mold clamping direction and the mold opening direction. Accordingly, the moving platen 22 is capable of moving in both the mold clamping direction and the mold opening direction by being guided by the plurality of tie bars 24 and the guide rail 26.

The mold clamping mechanism 12 includes a platen driving section 30, a cross head 32, and toggle links 34.

The platen driving section 30 includes a motor 30A, a drive pulley 30B connected to the motor 30A, a ball screw 30C attached to the rear platen 20, a driven pulley 30D connected to the ball screw 30C, and a belt 30E provided to the drive pulley 30B and the driven pulley 30D.

In the platen driving section 30, when the drive pulley 30B rotates in response to rotation of the motor 30A, the driven pulley 30D and the ball screw 30C rotate integrally due to the belt 30E. The axis of the ball screw 30C extends in the mold clamping direction and the mold opening direction. The cross head 32 is provided to a nut (not shown in the drawing) that is screwed onto the ball screw 30C. Accordingly, when the ball screw 30C rotates forward (or rotates backward) in response to a mold clamping operation, the cross head 32 moves in the mold clamping direction. On the other hand, when the ball screw 30C rotates backward (or rotates forward) in response to a mold opening operation, the cross head 32 moves in the mold opening direction.

The cross head 32 is connected to the moving platen 22, via the plurality of toggle links 34. Accordingly, when the cross head 32 moves in the mold clamping direction, the moving platen 22 is pushed by the cross head 32, via the plurality of toggle links 34, to move in the mold clamping direction.

When the moving platen 22 moves in the mold clamping direction, the movable mold 16B attached to the moving platen 22 moves in the mold clamping direction in accordance with this movement. When the movable mold 16B contacts the fixed mold 16A, a cavity to be filled with a molding material injected from an injection mechanism (not shown in the drawings) is formed in the mold 16.

On the other hand, when the cross head 32 moves in the mold opening direction, the moving platen 22 is pulled by the cross head 32, via the plurality of toggle links 34, to move in the mold opening direction.

When the moving platen 22 moves in the mold opening direction, the movable mold 16B attached to the moving platen 22 moves in the mold opening direction in accordance with this movement. When the movable mold 16B has been moved away to a position that is a prescribed distance from the fixed mold 16A, it is possible to remove the molded product that has filled the cavity of the mold 16 and hardened.

The safety apparatus 14 includes a safety bar 40, a latch 42, a latch driving section 44, and a judging section 46.

One end of the safety bar 40 is fixed to the moving platen 22 by a fixing member FM, and the safety bar 40 extends in the mold clamping direction and the mold opening direction from the moving platen 22 toward the rear platen 20. Furthermore, the safety bar 40 is supported by a support member SM that is capable of moving in the mold clamping direction and the mold opening direction relative to the rear platen 20. Accordingly, the safety bar 40 is capable of moving in conjunction with the moving platen 22 in the mold clamping direction and the mold opening direction.

The latch 42 includes a plurality of latch portions 42A and 42B arranged along the mold clamping direction and the mold opening direction. In the present embodiment, the latch 42 includes two kinds of latch portions, i.e., the latch portion 42A on the mold-clamping-direction side and the latch portion 42B on the mold-opening-direction side. The latch portion 42A on the mold-clamping-direction side and the latch portion 42B on the mold-opening-direction side may be in contact with each other or distanced from each other.

In the present embodiment, the latch portion 42A on the mold-clamping-direction side and the latch portion 42B on the mold-opening-direction side are in contact with each other. Furthermore, in the present embodiment, the "latch 42" refers to each of the latch portion 42A on the mold-clamping-direction side and the latch portion 42B on the mold-opening-direction side.

The latch 42 is capable of moving in a first direction away from the safety bar 40 and a second direction toward the safety bar 40, and moves by being driven by the latch driving section 44. In the present embodiment, the first direction is upward and the second direction is downward.

The latch driving section 44 is a portion of the drive mechanism that moves the latch 42 according to the opening and closing of a door provided in a cover of an injection molding device 10. The latch driving section 44 moves the latch 42 between a prescribed retracted position at which the latch 42 is distanced from the safety bar 40 and a prescribed contact position at which the latch 42 contacts the safety bar 40, according to the opening and closing of the door.

The latch driving section 44 holds the latch 42 at the retracted position when the door is closed. On the other hand, the latch driving section 44 holds the latch 42 at the contact position, in a state where the latch 42 is capable of moving up and down along the contour of the safety bar 40, when the door is open. The latch 42 held at the contact position may contact the safety bar 40 in a state where the latch 42 pushes against the safety bar 40.

The judging section 46 includes a sensor 46A for detecting the behavior of the latch 42 that moves up and down along the contour of the safety bar 40. The judging section 46 acquires a signal that is output from the sensor 46A and indicates a tip position of the latch 42 contacting the safety bar 40. The judging section 46 judges whether there is an operational abnormality in the latch 42 relative to the safety bar 40 based on the acquired signal.

If it is judged that the latch 42 has an operational abnormality relative to the safety bar 40, the judging section 46 notifies the safety apparatus 14 that there is a possibility of abnormal operation by driving a notifying section such as a speaker or display section. If it is judged that the latch 42 does not have an operational abnormality relative to the safety bar 40, the judging section 46 does not notify the safety apparatus 14 that there is a possibility of abnormal operation.

Figure 2:
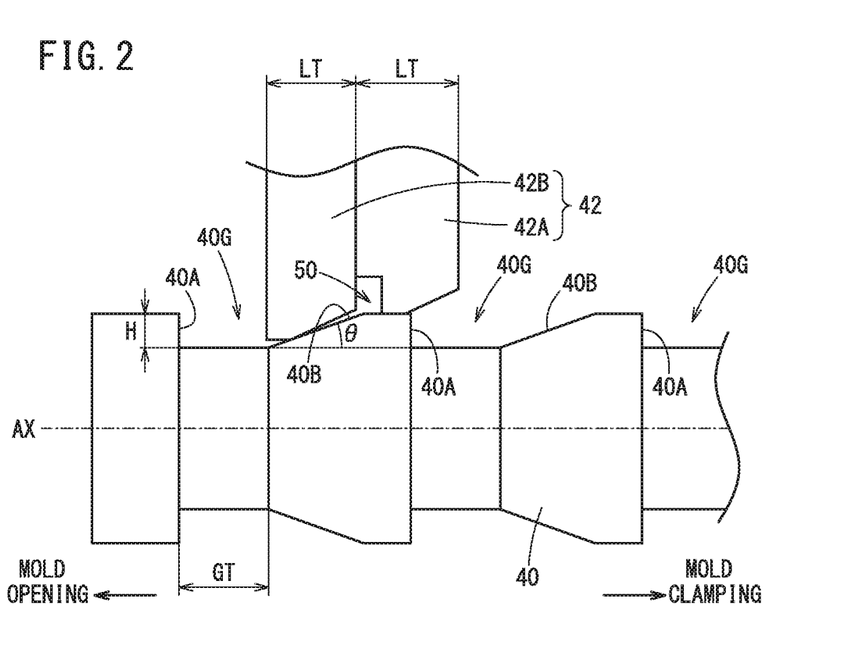
FIG. 2 is a side view of a portion of the safety apparatus.

The following is a more detailed description of the safety bar 40 and the latch 42, using FIG. 2. In FIG. 2, a state is shown in which the latch 42 and the safety bar 40 are in contact with each other (state where the door is open).

The safety bar 40 includes a plurality of grooves 40G provided at prescribed intervals along the longitudinal direction of the safety bar 40. Each of the plurality of grooves 40G is a groove that limits the movement of the safety bar 40 in the mold clamping direction with the latch 42 that contacts the safety bar 40 and permits movement of the safety bar 40 in the mold opening direction.

Furthermore, the safety bar 40 includes limiting portions 40A inside the plurality of respective grooves 40G, and inclined portions 40B between the plurality of grooves 40G.

Each movement limiting portion 40A is a region (wall surface) that limits movement of the safety bar 40 in the mold clamping direction with the latch 42 that is in contact with the safety bar 40. Each movement limiting portion 40A is positioned on the mold-opening-direction side inside a groove 40G, and extends in a direction substantially orthogonal to an axis AX of the safety bar 40. Each movement limiting portion 40A has substantially the same height H.

Each inclined portion 40B is a region (wall surface) that guides the latch 42 that is in contact with the safety bar 40. Each inclined portion 40B is positioned on the side (mold-clamping-direction side) of a groove 40G opposite a movement limiting portion 40A (the inclined portion 40B and the movement limiting portion 40A are on both sides of the groove 40G, respectively), and is inclined such that the distance from the axis AX of the safety bar 40 becomes greater farther in the mold clamping direction from the bottom surfaces of the grooves 40G. Each inclined portion 40B has substantially the same inclination angle θ.

Each inclined portion 40B extends in the mold clamping direction to a height that is the same as the height H of each movement limiting portion 40A. There is a flat portion that is substantially parallel to the axis AX of the safety bar 40, from a position of each inclined portion 40B at a height that is the same as the height H of each movement limiting portion 40A to each movement limiting portion 40A on the mold-clamping-direction side.

The latch 42 is board-shaped, for example, and the tip (bottom end) thereof on the side contacting the safety bar 40 has an inclined portion that is inclined along the inclination direction of the inclined portions 40B. The inclination angle of the inclined portion of the latch 42 is substantially the same as the inclination angle θ of each inclined portion 40B of the safety bar 40.

The latch thickness LT of the latch portion 42A on the mold-clamping-direction side is greater than the latch thickness LT of the latch portion 42B on the mold-opening-direction side. The latch thickness LT of the latch portion 42A may be greater than or equal to a prescribed thickness. The prescribed thickness is a limit value determined according to the relationship with respect to a groove width GT of the grooves 40G in the safety bar 40, for example.

The latch thickness LT is the length of the latch portions 42A or 42B in the mold clamping direction and the mold opening direction (parallel to the axis AX direction of the safety bar 40). The groove width GT is a length of each groove 40G in the mold clamping direction and the mold opening direction (parallel to the axis AX direction of the safety bar 40).

The latch thickness LT of the latch portion 42A on the mold-clamping-direction side may be the same as the grove width GT of each groove 40G, may be less than the groove width GT, or may be greater than the groove width GT. The same is true for the latch thickness LT of the latch portion 42B on the mold-opening-direction side.

The following describes an operation of the safety bar 40 during a mold clamping operation or mold opening operation. When the door transitions from being closed to being open, it is assumed that, as shown in FIG. 2, the latch portion 42B on the mold-opening-direction side contacts the inclined portion 40B, and that the latch portion 42A on the mold-clamping-direction side contacts the flat portion. At the timing when the door has transitioned from being closed to being open, it is assumed that the mold clamping operation and the mold opening operation are not performed.

Then, when the mold clamping operation is performed from a state in which the latch portion 42B is in contact with an inclined portion 40B, the safety bar 40 moves in the mold clamping direction in conjunction with the moving platen 22 (see FIG. 1) that moves in the mold clamping direction according to this mold clamping operation. In accordance with this movement, the latch portion 42B enters into a groove 40G, and the movement limiting portion 40A of the safety bar 40 is caught on the latch portion 42B that has entered into the groove 40G to achieve engagement. In this way, the movement of the safety bar 40 in the mold clamping direction is limited.

On the other hand, when the mold opening operation is performed from a state where the latch portion 42B is in contact with an inclined portion 40B, the safety bar 40 moves in the mold opening direction in conjunction with the moving platen 22 (see FIG. 1) that moves in the mold opening direction according to this mold opening operation. At this time, the latch portion 42B contacts the inclined portion 40B, and is guided to the mold-clamping-direction side by this inclined portion 40B.

Figure 3:
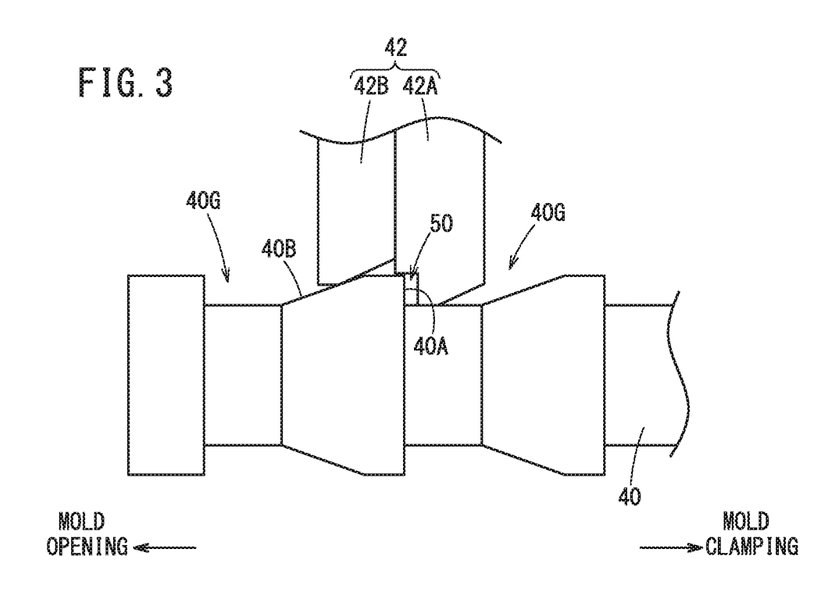
FIG. 3 shows a state of operation of the safety apparatus.

In accordance with this guidance, as shown in FIG. 3, the latch portion 42A that has contacted the flat portion drops into the groove 40G that is on the mold-clamping-direction side of the latch portion 42B. Since the safety bar 40 is moving in the mold opening direction, the movement limiting portion 40A inside the groove 40G on the mold-clamping-direction side does not catch on (engage with) the latch portion 42A that has dropped into this groove 40G. Accordingly, the movement of the safety bar 40 in the mold opening direction proceeds without being limited.

In this way, when the safety bar 40 moves in the mold opening direction, the latch 42 moves by sliding up and down along the contour (peripheral surface) of the safety bar 40, thereby allowing the safety bar 40 to move in the mold opening direction.

As shown in FIGS. 2 and 3, a notch 50 is provided in the mold-opening-direction-side surface of the latch portion 42A on the mold-clamping direction side in the present embodiment. The height of the notch 50 is greater than or equal to the height H of the movement limiting portions 40A. The thickness of the notch 50 is set according to the latch thickness LT of the latch portion 42A or the like. For example, the thickness of the notch 50 is set to be greater when the latch thickness LT of the latch portion 42A is greater.

By providing the notch 50 in the latch portion 42A, when the safety bar 40 moves in the mold opening direction, the time until the latch portion 42A that moves along the flat portion of the safety bar 40 drops into the groove 40G on the mold-clamping-direction side is shortened.

That is, when the safety bar 40 moves in the mold-opening-direction, the timing at which the latch portion 42A enters into the groove 40G of the safety bar 40 becomes earlier. Accordingly, compared to a case where there is no notch 50, even when the latch thickness LT of the latch portion 42A is increased, it is possible to reduce the delay in the timing at which the latch portion 42A enters into the groove 40G of the safety bar 40 during the mold opening operation.

In a case where only the latch portion 42A on the mold-clamping-direction side enters into a groove 40G, the bending stress received by the latch portion 42A when limiting the movement of the safety bar 40 in the mold clamping direction is greater than in a case where both the latch portion 42A and the latch portion 42B enter into grooves 40G. Accordingly, in the safety apparatus 14 where a state in which only the latch portion 42A on the mold-clamping-direction side enters into (drops into) a groove 40G can occur, it is especially effective to provide the notch 50 in the latch portion 42A since it is necessary to increase the thickness of the latch portion 42A on the mold-clamping direction side.

Figure 4:
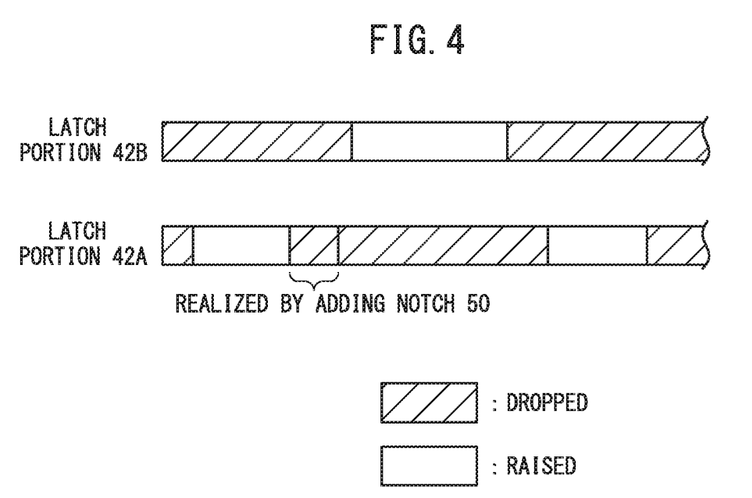
FIG. 4 shows a state in which change of a latch relative to a safety bar is prompted electrically.

The following describes the judging section 46 with reference to FIG. 4. In FIG. 4, the state of the movement of the latch portion 42B on the mold-opening-direction side is shown in the gauge on the top side, and the state of the movement of the latch portion 42A on the mold-clamping-direction side is shown in the gauge on the bottom side.

The "dropped" portion in the gauges on the top side and bottom side refers to a case where the judging section 46 recognizes that the height of the bottom end of the latch portion 42A or 42B from a reference surface such as the floor surface of the groove 40G is less than or equal to a prescribed threshold value, based on the output of the sensor 46A. On the other hand, the "raised" portion in the gauges on the top side and bottom side refers to a case where the judging section 46 recognizes that the height of the bottom end of the latch portion 42A or 42B from the reference surface exceeds the prescribed threshold value, based on the output of the sensor 46A.

In the example show in FIG. 4, if both latch portions 42A and 42B are recognized as being in the raised state (a case where the non-hatched portions overlap), the judging section 46 judges that there is an operational abnormality in the latch 42 relative to the safety bar 40.

Since the notch 50 is provided in the clamp-opening-direction-side surface of the latch portion 42A the timing at which the latch portion 42A starts to drop is earlier than in a case where this notch 50 is not provided. Therefore, even when the latch thickness LT of the latch portion 42A is increased, it becomes unlikely that the judging section 46 would make a mistaken judgment that the latch 42 has an operational abnormality relative to the safety bar 40 due to the increased latch thickness LT. [Modifications] The embodiment described above may be modified as described below.

(First Modification)

Figure 5A:
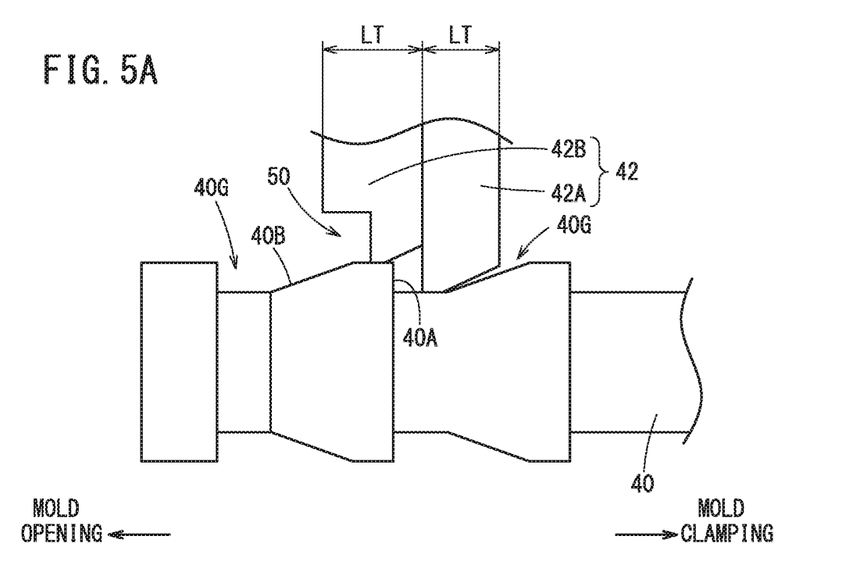
FIG. 5A is a side view of a non-engaged state of a latch portion of a first modification.
Figure 5B:
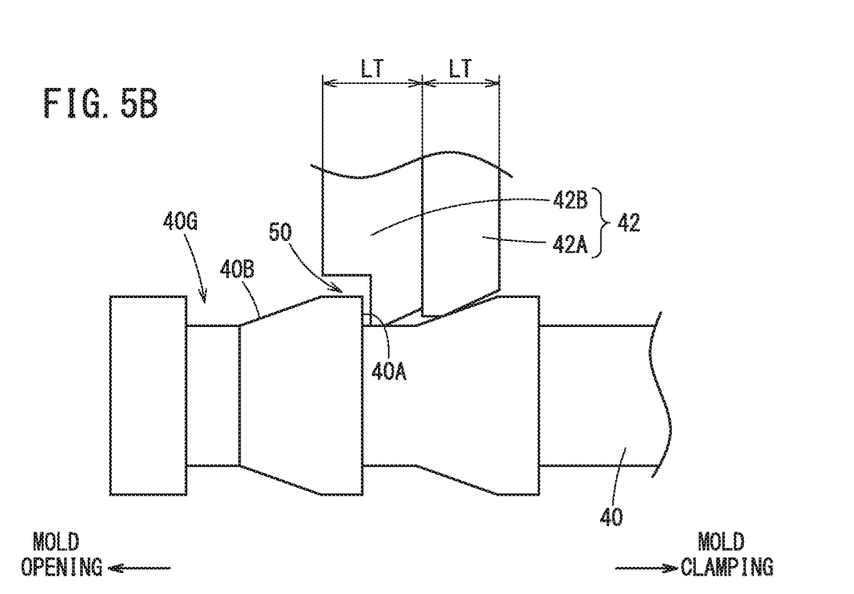
FIG. 5B is a side view of an engaged state of the latch portion of the first modification.

The latch 42 of the first modification is described using FIGS. 5A and 5B. In FIGS. 5A and 5B, the configurations that are equivalent to configurations described in the embodiment above are given the same reference numerals. In the present modification, descriptions that overlap with those of the embodiment above are omitted.

In the first modification, the latch thickness LT of the latch portion 42B on the mold-opening-direction side is greater than the latch thickness LT of the latch portion 42A on the mold-clamping-direction side. The latch thickness LT of the latch portion 42B on the mold-opening-direction side may be greater than or equal to a prescribed thickness.

Furthermore, in the first modification, the notch 50 is provided in the latch portion 42B on the mold-opening-direction side. This notch 50 is provided on the mold-opening-direction-side surface of the latch portion 42B on the mold-opening-direction side.

Therefore, when the safety bar 40 moves in the mold opening direction, the timing at which the latch portion 42B engages with a groove 40G of the safety bar 40 becomes earlier. Accordingly, compared to a case where the notch 50 is not provided, even when the latch thickness LT of the latch portion 42B is increased, it is possible to reduce the delay in the engagement of the latch portion 42B during the mold opening operation.

(Second Modification)

Figure 6A:
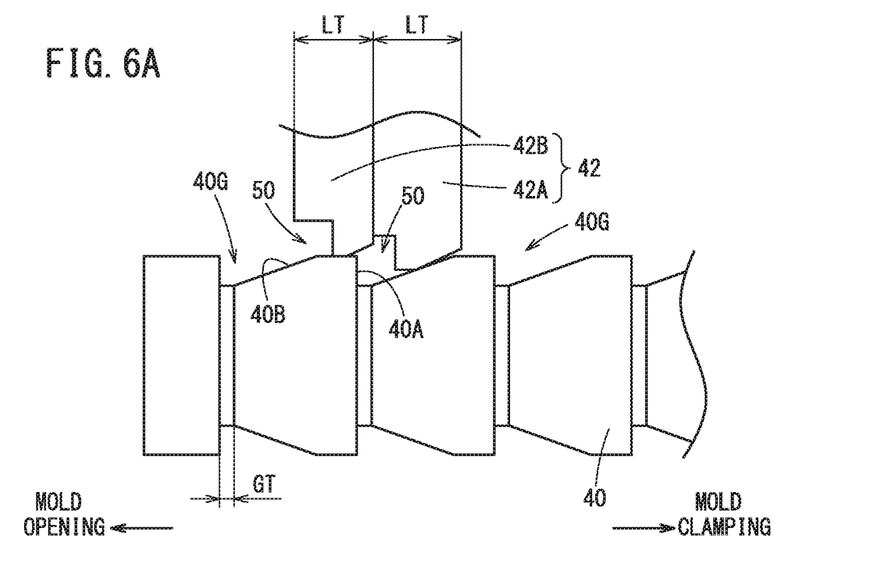
FIG. 6A is a side view of a non-engaged state of a latch portion of a second modification.
Figure 6B:
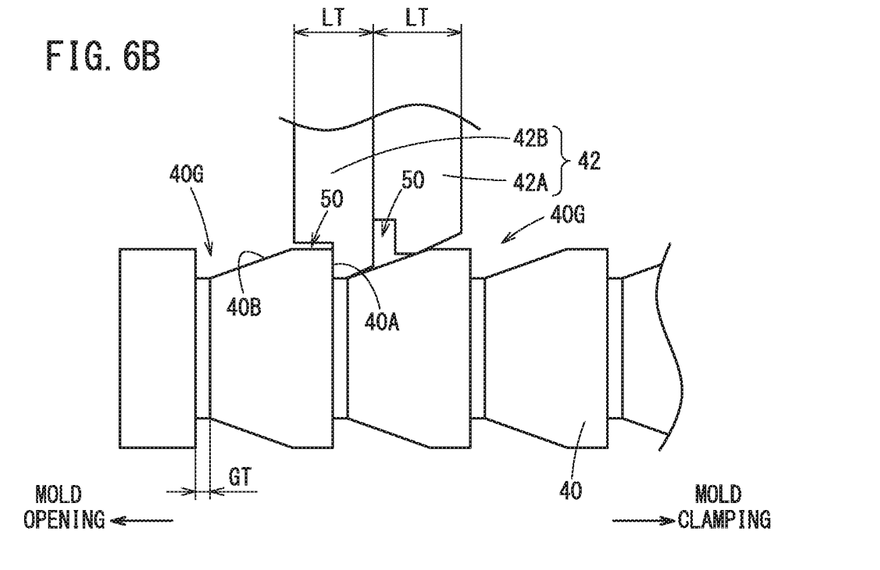
FIG. 6B is a side view of an engaged state of the latch portion of the second modification.

The latch 42 of the second modification is described using FIGS. 6A and 6B. In FIGS. 6A and 6B, the configurations that are equivalent to configurations described in the embodiment above are given the same reference numerals. In the present modification, descriptions that overlap with those of the embodiment above are omitted.

In the second modification, the latch thickness LT of the latch portion 42A on the mold-clamping-direction side and the latch thickness LT of the latch portion 42B on the mold-opening-direction side are approximately the same, and each latch thickness LT is significantly greater than the groove width GT of the grooves 40G. In other words, the groove width GT of the grooves 40G are significantly less than the latch thickness LT of each latch portion 42A and 42B.

Furthermore, in the second modification, a notch 50 is provided in both the latch portion 42A on the mold-clamping-direction side and the latch portion 42B on the mold-opening-direction side. The notch 50 provided in the latch portion 42A on the mold-clamping-direction side and the notch 50 provided in the latch portion 42B on the mold-opening-direction side are each provided on the mold-opening-direction-side surface thereof.

In this way, when the safety bar 40 moves in the mold opening direction, the timing at which the latch portion 42A and the latch portion 42B each engage with a groove 40G of the safety bar 40 becomes earlier. Accordingly, compared to a case where no notches 50 are provided, even if the latch thickness LT of the latch portion 42A and the latch portion 42B is increased, it is possible to reduce the delay in the engagement of the latch 42 during the mold opening operation.

In the present modification, since the groove width GT of the grooves 40G is significantly less than the latch thickness LT of each latch portion 42A and 42B, the interval during which the latch portions 42A and 42B are dropped in the grooves 40G is short. Therefore, if a notch 50 is not provided to each of latch portion 42A and 42B, the judging section 46 becomes prone to mistakenly judge that there is an operational abnormality by recognizing that both latch portions 42A and 42B are raised. Accordingly, in a case where the groove width GT of the grooves 40G is significantly less than the latch thickness LT of each latch portion 42A and 42B, it is especially effective to provide a notch 50 to each latch portion 42A and 42B.

(Third Modification)

In the embodiment described above, there are two latch portions (latch portions 42A and 42B), but the number of latch portions may be one or may be three or more.

Even when the number of latch portions is one or three or more, in the same manner as in the embodiment described above where the number of latch portions is two, it is possible to reduce the delay in the engagement during the mold opening operation even when the latch thickness LT is increased.

In a case where the number of latch portions is one, there are situations where a state in which the one latch portion 42A is not engaged with a groove 40G continues, and it is possible for the judging section 46 to mistakenly judge that there is an operational abnormality in such a situation. Accordingly, in a case where the number of latch portions is one, it is necessary to adopt a judgment method that is different from the method of the embodiment described above.

(Fourth Modification)

The embodiment and modifications described above may be combined in any matter, as long as the combination does not cause a contradiction. [Invention Obtainable from the Embodiment] The following is a record of the invention that can be understood from the embodiment and modifications described above.

The present invention is the safety apparatus (14) including:

the safety bar (40) that is movable in the mold clamping direction and the mold opening direction, in conjunction with the moving platen (22) provided with the movable mold (16B); and the latch (42) configured to contact the safety bar (40) when a door is open, the door provided in a cover of the injection molding device, wherein the safety bar (40) includes the plurality of grooves (40G) provided at intervals along the longitudinal direction of the safety bar (40), and the inclined portion (40B) that is provided between the plurality of grooves (40G) and has a distance from the axis (AX) of the safety bar (40) that becomes greater farther in the mold clamping direction, and the latch (42) includes the notch (50) in a surface thereof on a side in the mold opening direction.

Therefore, even when the latch thickness (LT) is increased, it is possible to reduce the delay in the timing at which the latch (42) enters into the groove (40G) of the safety bar (40) during the mold opening operation.

The latch (42) may include the plurality of latch portions (42A, 42B) arranged along the mold clamping direction and the mold opening direction, and the notch (50) may be provided in at least one of the plurality of latch portions (42A, 42B). Therefore, even if the latch thickness (LT) of the latch portion (42A, 42B) provided with the notch (50) is increased, the timing at which this latch portion (42A, 42B) enters into the groove (40G) during the mold opening operation can be made earlier.

The notch (50) may be provided in the latch portion (42B) arranged farthest on the mold-opening-direction side.

Therefore, even if the latch thickness (LT) of the latch portion (42B) arranged farthest on the mold-opening-direction side is increased, the timing at which this latch portion (42B) enters into the groove (40G) during the mold opening operation can be made earlier.

The notch (50) may be provided in the latch portion (42A) arranged farthest on a side in the mold clamping direction. Therefore, even if the latch thickness (LT) of the latch portion (42A) arranged farthest on the mold-clamping-direction side is increased, the timing at which this latch portion (42A) enters into the groove (40G) during the mold opening operation can be made earlier.

The notch (50) may be provided in the latch portion (42A, 42B) whose latch thickness (LT) in the mold clamping direction and the mold opening direction is greater than or equal to a prescribed thickness. Therefore, the timing at which the latch portion (42A, 42B) whose latch thickness (LT) is greater than or equal to the prescribed thickness enters into the groove (40G) during the mold opening operation can be made earlier.

The notch (50) may be provided in each of the plurality of latch portions (42A, 42B). Therefore, even if the latch thickness (LT) of each of the plurality of latch portions (42A, 42B) is increased, the timing at which these latch portions (42A, 42B) enter into grooves (40G) during the mold opening operation can be made earlier. This is especially effective in a case where the groove width (GT) of the grooves (40G) is significantly less than the latch thickness (LT) of each latch portion (42A, 42B).

The present invention is not limited to the embodiments described above, and it goes without saying that the embodiments can be freely modified within a range that does not deviate from the essence and gist of the present invention as set forth in the appended claims.

What is claimed is:

1. A safety apparatus, comprising:
a safety bar that is movable in a mold clamping direction and a mold opening direction, in conjunction with a moving platen provided with a movable mold; and
a latch configured to contact the safety bar when a door is open, the door being provided in a cover of an injection molding device,
wherein the safety bar includes a plurality of grooves provided at intervals along a longitudinal direction of the safety bar, and an inclined portion that is provided between the plurality of grooves and has a distance from an axis of the safety bar that becomes greater farther in the mold clamping direction,
wherein the latch includes a notch in a surface thereof on a side in the mold opening direction, and
wherein the notch includes an indentation on a surface of the latch that is on the side in the mold opening direction, the notch extending to a bottom surface of the latch and being distanced from an other surface of the latch that is on a side in the mold clamping direction,
wherein the latch includes a plurality of latch portions arranged along the mold clamping direction and the mold opening direction,
wherein the notch is provided in at least one of the plurality of latch portions, and
wherein a thickness of a latch portion of the latch portions that is exposed, to the moving platen is more than a thickness of another latch portion of the latch portions that is located adjacent to the latch portion of the latch portions.

2. The safety apparatus according to claim 1, wherein the notch is provided in the latch portion of the latch portions arranged farthest on the side in the mold opening direction.

3. The safety apparatus according to claim 1, wherein the notch is provided in the another latch portion of the latch portions arranged farthest on the side in the mold clamping direction.

4. The safety apparatus according to claim 1, wherein the notch is provided in the latch portion of the latch portions having the thickness in the mold clamping direction and the mold opening direction that is greater than or equal to a prescribed thickness.

5. The safety apparatus according to claim 1, wherein the notch is provided in each of the plurality of latch portions.

6. The safety apparatus according to claim 1, wherein the surface of the latch faces the mold opening direction.

7. The safety apparatus according to claim 6, wherein the other surface of the latch faces the mold clamping direction.

8. The safety apparatus according to claim 1, wherein the notch extends only on the surface of the latch that faces away from the moving platen.

9. The safety apparatus according to claim 1, wherein the latch further includes an inclined surface that extends between the other surface of the latch and the bottom surface of the latch, the inclined surface of the latch being distanced from the notch.

10. The safety apparatus according to claim 9, wherein the bottom surface of the latch extends parallel to the axis of the safety bar, the bottom surface extending between the inclined surface of the latch and the notch, and
wherein, in a state that the door is open, the bottom surface of the latch is distanced from the grooves, and in a state that the door is closed, the bottom. surface of the latch contacts one of the grooves.

11. The safety apparatus according to claim 1, wherein a height of the notch is greater than or equal to a height of a movement limiting portion of the safety bar, the movement limiting portion being provided in a groove of the plurality of grooves.

12. The safety apparatus according to claim 1, wherein the notch is provided only in the latch portion of the latch portions that is exposed to the moving platen.

13. A safety apparatus, comprising;
a safety bar that is movable in a mold clamping direction and a mold opening direction, in conjunction with a moving platen provided with a movable mold; and
a latch configured to contact the safety bar,
wherein the safety bar includes a plurality of grooves provided along a longitudinal direction of the safety bar, and an inclined portion that is provided between the plurality of grooves, and
wherein the latch includes:
a side surface that is on a side in the mold clamping direction;
an other side surface that is on a side in the mold opening direction;
a bottom surface extending between the side surface and the other side surface; and
a notch including an indentation on the other side surface, the notch terminating at an edge of the bottom surface,
wherein the latch includes a plurality of latch portions arranged along the mold clamping direction and the mold opening direction,
wherein the notch is provided in at least one of the plurality of latch portions, and
wherein a thickness of a latch portion of the latch portions that is exposed to the moving platen is more than a thickness of another latch portion of the latch portions that is located adjacent to the latch portion of the latch portions.

14. The safety apparatus according to claim 13, wherein the other side surface of the latch faces the mold opening direction, and the side surface of the latch faces the mold clamping direction.

15. The safety apparatus according to claim 13, wherein the notch is distanced from the side surface of the latch.

16. The safety apparatus according to claim 13, wherein the notch extends only on the other side surface of the latch.

17. The safety apparatus according to claim 13, wherein the latch further includes an inclined surface that is distanced from the notch, and
wherein, between the inclined surface of the latch and the notch, the bottom surface of the latch extends parallel to the axis of the safety bar.

18. The safety apparatus according to claim 13, wherein a height of the notch is greater than or equal to a height of a movement limiting portion of the safety bar, the movement limiting portion being provided in a groove of the plurality of grooves.

* * * * *